United States Patent [19]

Tarozzi et al.

[11] Patent Number: 4,648,512
[45] Date of Patent: Mar. 10, 1987

[54] PORTABLE COOLER WITH SIDE RECEPTACLE

[75] Inventors: Richard A. Tarozzi, Gales Ferry; Charles Formhals, Ledyard, both of Conn.

[73] Assignee: King-Seeley Thermos Co., Norwich, Conn.

[21] Appl. No.: 723,444

[22] Filed: Apr. 15, 1985

[51] Int. Cl.⁴ .................................... B65D 81/38
[52] U.S. Cl. .............................. 206/542; 206/541; 206/545
[58] Field of Search ............................ 206/541–549

[56] References Cited

U.S. PATENT DOCUMENTS

| | | |
|---|---|---|
| 450,988 | 4/1891 | Brown ................................ 206/542 |
| 537,178 | 4/1895 | Blalock ............................... 206/541 |
| 2,487,220 | 11/1949 | Callaghan ........................ 206/541 |
| 2,858,957 | 11/1958 | Darrah . |
| 3,139,179 | 6/1964 | Cadotte . |
| 3,143,205 | 8/1964 | Ruderian . |
| 3,640,380 | 2/1972 | Huffman . |
| 3,648,830 | 3/1972 | Graf . |
| 3,667,646 | 6/1972 | Graf . |
| 3,909,092 | 9/1975 | Kiernan . |
| 3,977,521 | 8/1976 | Murphy . |
| 4,050,581 | 9/1977 | Sedlacek . |
| 4,128,170 | 12/1978 | Elliott . |
| 4,166,547 | 9/1979 | Castelli . |
| 4,195,757 | 4/1980 | Jefferson . |
| 4,279,342 | 7/1981 | Van Pelt . |
| 4,280,336 | 7/1981 | Taylor . |
| 4,320,846 | 3/1982 | Meyering et al. . |
| 4,350,274 | 9/1982 | Morgan . |

FOREIGN PATENT DOCUMENTS

| | | |
|---|---|---|
| 0056775 | 7/1982 | European Pat. Off. ............ 206/541 |
| 2549354 | 1/1985 | France .............................. 206/541 |
| 0080434 | 7/1952 | Norway ............................ 206/541 |
| 1314020 | 4/1973 | United Kingdom ............... 206/545 |

Primary Examiner—William Price
Assistant Examiner—Jimmy G. Foster
Attorney, Agent, or Firm—Harness, Dickey & Pierce

[57] ABSTRACT

An improved portable cooler construction having a pair of recesses formed in opposing side wlls that define with pivotally supported closure members additional cavities that will be maintained at a different temperature than the main cavity formed in the main body portion of the cooler and in which non-food articles may be stored and/or carried.

5 Claims, 6 Drawing Figures

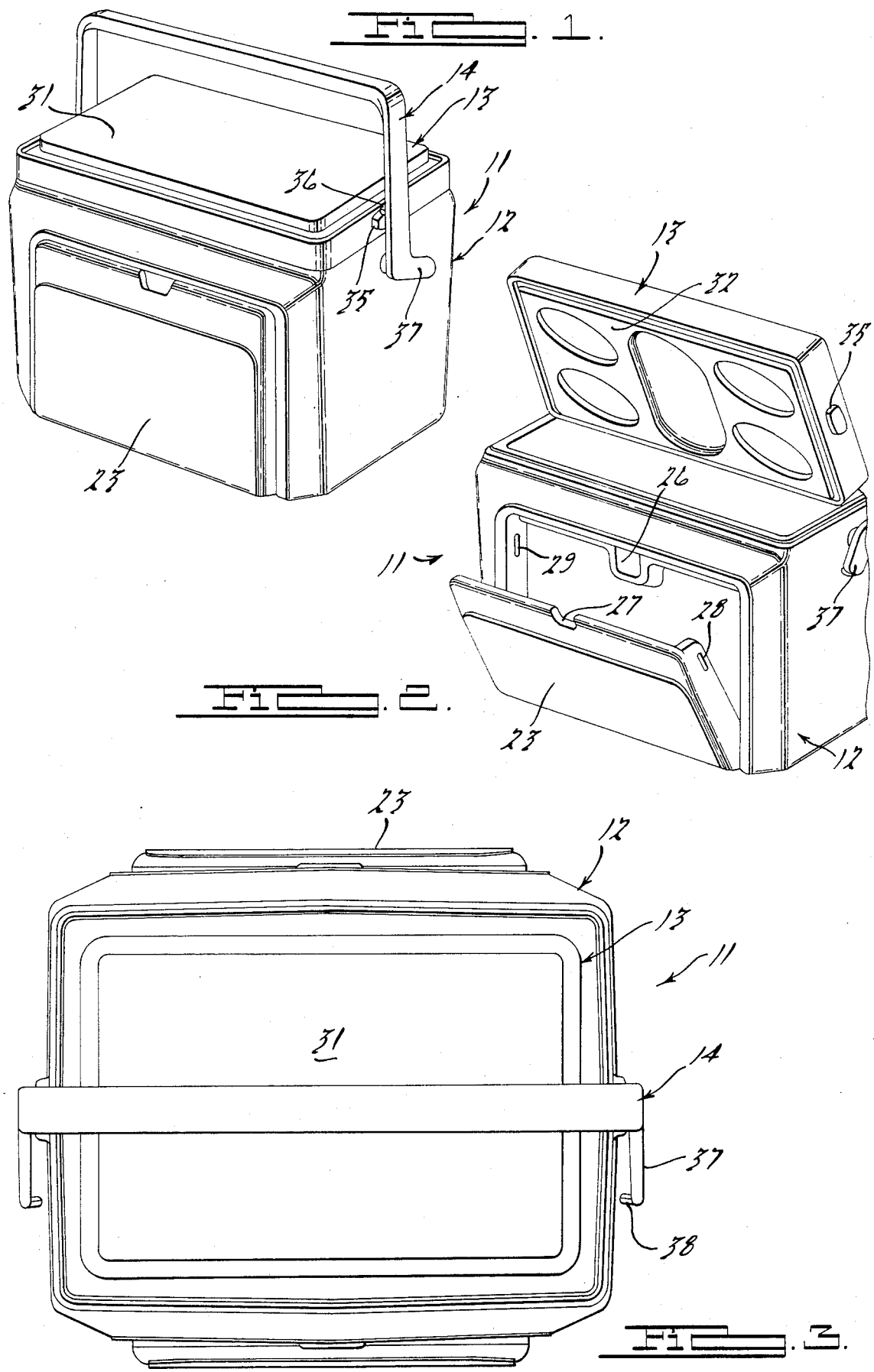

PORTABLE COOLER WITH SIDE RECEPTACLE

BACKGROUND OF THE INVENTION

This invention relates to a portable cooler construction and more particularly to an improved portable cooler construction embodying article receiving cavities formed in its side walls.

The use of portable cooler assemblies is well known. Such devices normally include a body portion that defines an internal cavity in which food articles such as bottles, cans, ice or other similar materials may be contained. The cavity normally opens through the upper end of the main body portion and some type of lid arrangement is employed for opening and closing the access to the cavity. Although such devices have a wide variety of utility and application, they basically require all of the articles to be stored at the same temperature. Although removable trays have been proposed for insertion into the cavity to provide an area where articles may be stored at a somewhat different temperature, the temperature gradient is not particularly significant between the area in the tray and the main area in the cooler.

In addition to food articles, portable coolers are frequently used to carry non-food items such as the user's personal belongings. Coolers are frequently used at locations such as the beach where the user may wish to carry other articles such as sunglasses, suntan oil, keys, cigarettes, wallets and the like and which are not conveniently carried on the person. Frequently, the user will place these articles in the tray of the cooler. This means that the cooler is opened each time that one of these articles is sought or placed and the temperature holding qualities of the cooler are seriously reduced. In addition, there is the likelihood that these non-food articles may become wet if placed in the cooler and, therefore, such in the cooler storage with coolers of the type previously proposed has not been particularly advantageous.

It is, therefore, a principal object of this invention to provide an improved cooler construction that embodies a plurality of article receiving cavities.

It is another object of this invention to provide an improved cooler assembly that permits the accommodation of a wide variety of articles which may be stored at different temperatures.

Although devices have been proposed for providing portable food receiving articles with a plurality of separate containers, such devices have been somewhat awkward in appearance and have given the impression of having a "tacked on" configuration.

It is, therefore, a still further object of this invention to provide an improved portable cooler assembly having an integrated configuration and yet providing a plurality of article receiving cavities.

SUMMARY OF THE INVENTION

This invention is adapted to be embodied in a portable cooler construction having a main body portion defining a cavity for receiving food products and an opening for affording access to the cavity through an upper surface of the main body portion. A first closure is provided for selectively opening and closing the opening. In accordance with the invention, a recess is formed in a side wall of the main body portion and a second closure is provided for selectively opening and closing this recess. The recess and the closure are configured to form a storage area that is adapted to receive articles when the second closure is in its closed position and to permit insertion and removal thereof when opened. The second closure is substantially coextensive with the recess and the side wall when it is in its closed position.

BRIEF DESCRIPTION OF THE DRAWINGS

FIG. 1 is a perspective view of a portable cooler constructed in accordance with an embodiment of the invention, with all its closures in place and with the carrying handle in a locked, upright position.

FIG. 2 is a perspective view, in part similar to FIG. 1, and shows the closures in a partially opened position.

FIG. 3 is an enlarged, top plan view of the cooler.

DETAILED DESCRIPTION OF THE PREFERRED EMBODIMENT

Figure 4:
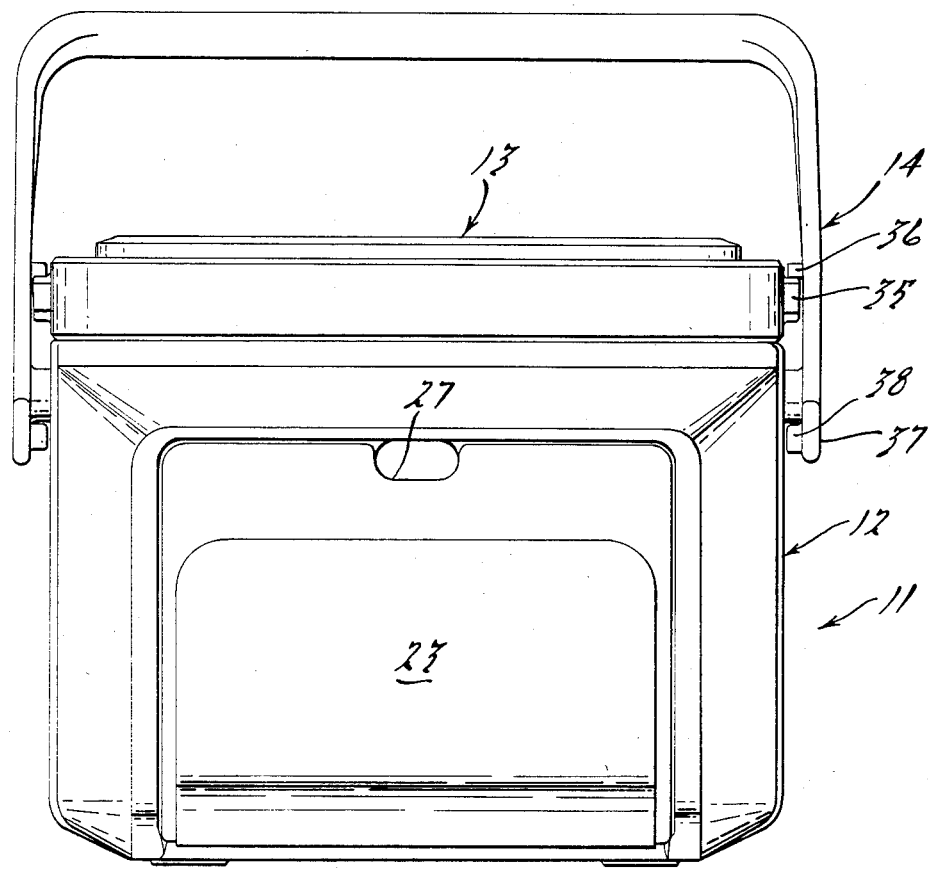
FIG. 4 is an enlarged, side elevational view of the cooler.
Figure 5:
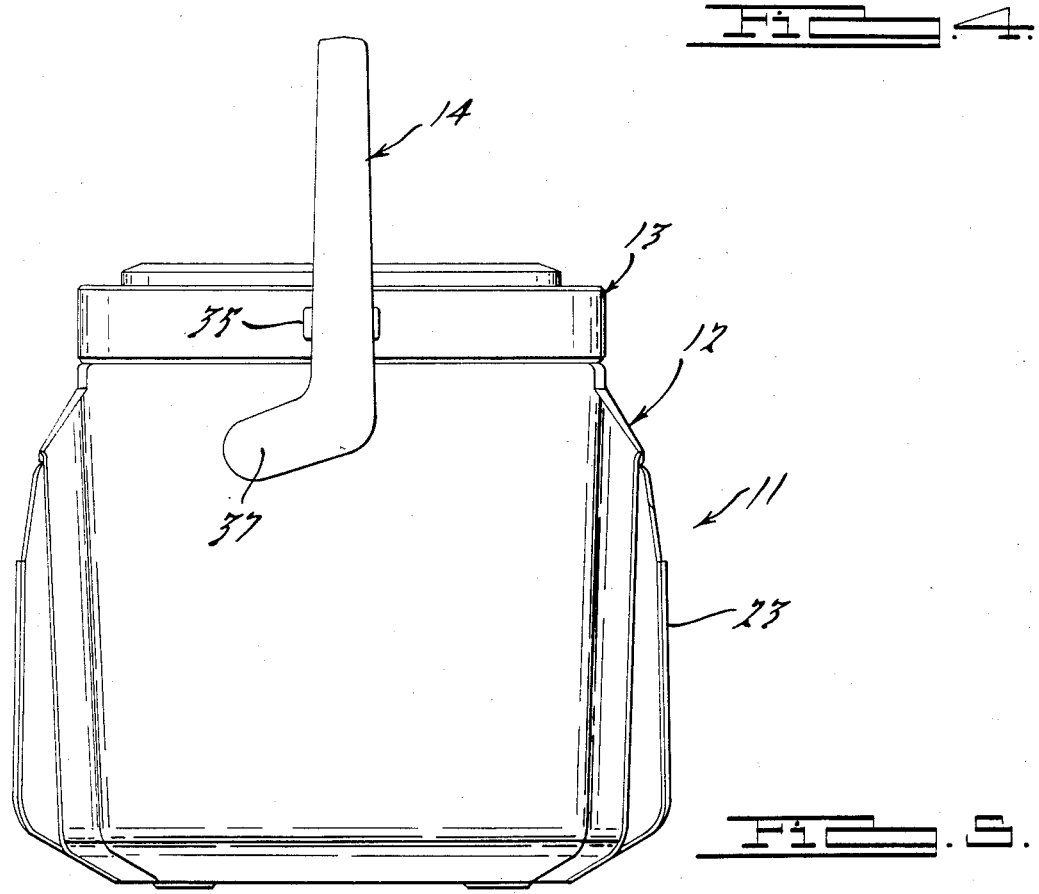
FIG. 5 is an enlarged, end elevational view of the cooler.
Figure 6:
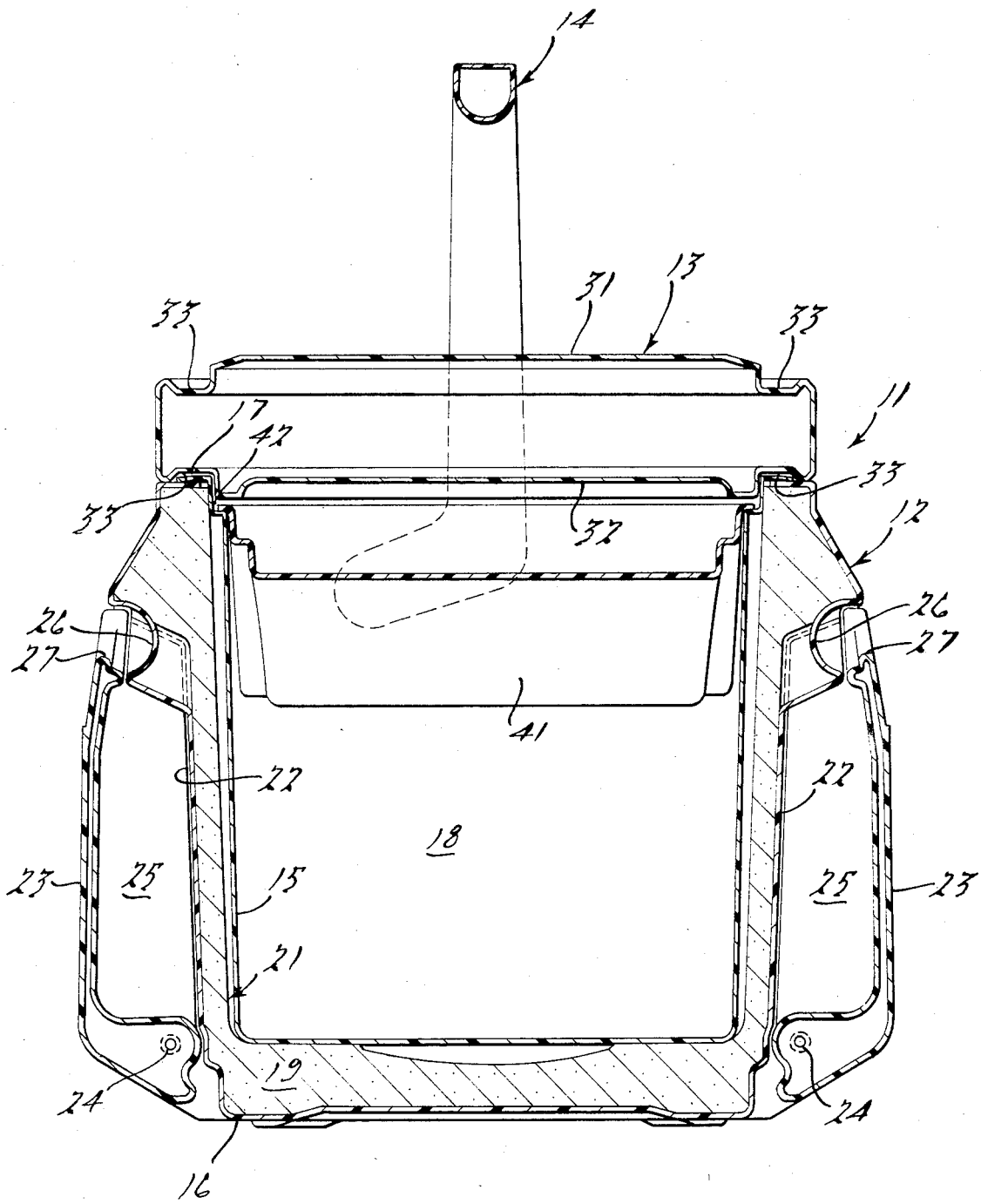
FIG. 6 is a further enlarged, cross-sectional view taken along a plane that is parallel to the end walls of the cooler.

Referring now in detail to the drawings, a portable cooler constructed in accordance with an embodiment of the invention is identified generally by the reference numeral 11. The cooler 11 is comprised of a main body portion, indicated generally by the reference numeral 12, a lid, indicated generally by the reference numeral 13, and a combined carrying handle, locking mechanism, indicated generally by the reference numeral 14.

The main body portion 12 is formed of a double walled construction comprising an inner shell 15 and an outer shell 16. The shells 15 and 16 may be formed from a suitable material such as molded plastic and are affixed to each other along an upper sealing edge at a joint 17. The inner shell 15 defines a main food receiving cavity 18 that is open at its upper end through an opening which is surrounded by the joint 17. The food receiving cavity 18 is defined by two opposing generally planar side walls, two opposing generally planar end walls and a bottom wall.

The outer shell 16 is spaced from the inner shell 15 and defines an insulating cavity 19 that may be filled with a suitable insulating material, such as a foamed plastic 21. On opposing side walls, the outer shell 16 is provided with a pair of centrally positioned indentations or recesses 22. These recesses are accessible through a pair of respective closure members 23 which are journaled for opening and closing movement by the main body portion 12 by means of a pair of pivot pins 24 that are positioned at the lower ends of the recesses 22 and which journal the closure members 23 for movement between a closed position, as shown in all of the figures except for FIG. 2, and an opened position, partially shown in FIG. 2. In the closed position, the recesses 22 and closure members 23 define article receiving cavities 25 which are separated from the cavity 18 by a portion of the insulating material 21.

The portions of the side walls of the outer shell 16 at the upper portion of the recess 22 are provided with annular indentations 26 that afford a grip whereby a user may grasp a correspondingly shaped recess 27 formed in the closure members 23 so as to open and close the closure members 23. The closure members 23 are retained in a closed position by locking projections 28 (FIG. 2) that are formed at their opposite sides and which engage corresponding recesses 29 formed in the opposite sides of the outer shell 17 at the periphery of the recesses 22.

When the closure members 23 are in their closed position, the cooler 11 has a generally integrated appearance since the closure members 23 extend across the recesses 22 and, when in their closed position, provide a substantially continuous surface with the side faces of the main body portion 12.

The lid 13 may be of any desired construction and, in the illustrated embodiment, is formed by a first surface 31 that may be configured as a generally planar surface and a second surface 32 which is configured with article receiving recesses. The surfaces 31 and 32 are each bounded by sealing surfaces 33 that are adapted to engage the upper surface of the main body member 12 regardless of which of the surfaces 31 and 32 is positioned lowermost so as to effect sealing of the closure member 13 in either condition. The closure member 13 is provided with a pair of outwardly extending locking lugs 35 at its opposite sides which are engaged by locking lugs 36 formed on the handle member 14 for locking the lid 13 to the main body portion 12 when the handle 14 is in the uppermost carrying position as shown in FIG. 1. In addition, the side edges 37 of the handle 14, which are pivotally supported to the main body portion 12, are formed with a generally L-shape and carry further locking lugs 38 that are adapted to engage the lid locking lugs 35 when the handle 14 is rotated to one of its lowermost positions. When the handle 14 is rotated to the other lowermost position, the lid locking lugs 35 are free and the lid 13 may be readily removed.

An insertable tray 41, which may be of any suitable configuration, is adapted to be positioned within the cavity 18 and supported on a shoulder 42 formed around the opening and below the mating joint 17 so that the tray 41 will be held in position when the closure 13 is in place. As is well known, food articles may be contained within the tray 41.

It should be readily apparent from the described construction that a highly effective cooler arrangement is provided wherein, in addition to the main food receiving cavity, there are additional storage cavities formed in the side walls which are closed by closure members that provide a flush surface and which cavities may be maintained at a substantially different temperature than the main cavity of the cooler. Although the invention has been described in conjunction with a cooler having a removable lid, the invention may be equally as well applied to coolers having integral lids or coolers of other types. Various other changes and modifications may be made, without departing from the spirit and scope of the invention, as defined by the appended claims.

We claim:

1. A portable cooler construction having a main body portion having rigid insulating walls formed by a molded inner shell defining a cavity for receiving food products and an opening for affording access to said cavity through an upper surface of said main body portion and a molded outer shell defining an open volume in which said inner shell is nested, and a first closure for selectively opening and closing said opening, the improvement comprising said inner and said outer shells defining an insulating space therebetween and surrounding said cavity, a recess formed in a side wall of said outer shell of said main body portion extending into and surrounded by said insulating space and separated by a portion of said insulating space from said cavity so that said recess and said cavity are each insulated and are insulated from each other, and a second closure for selectively opening and closing said recess said second closure being formed of a double wall construction with an air gap therebetween, said recess and said closure being configured to form a storage area adapted to receive articles when said second closure is in its closed position and to permit insertion and removal thereof when opened, said second closure being substantially coextensive with said recess and said side wall when in its closed position.

2. A portable cooler construction as set forth in claim 1 wherein the second closure is pivotally supported by the main body portion for movement between its opened and its closed positions.

3. A portable cooler construction as set forth in claim 2 wherein the recess extends the substantially full height of the side wall and the second closure is pivotally supported to the main body portion at the lower end of the recess.

4. A portable cooler construction as set forth in claim 2 further including latching means for retaining the second closure in its closed position.

5. A portable cooler construction as set forth in claim 1 wherein there are a pair of recesses formed in opposing side walls of the outer shell and pairs of second closure members each adapted to cooperate with a respective one of the recesses.

* * * * *